United States Patent
Willis et al.

(10) Patent No.: US 11,570,198 B2
(45) Date of Patent: Jan. 31, 2023

(54) DETECTING AND QUANTIFYING VULNERABILITIES IN A NETWORK SYSTEM

(71) Applicant: Bank of America Corporation, Charlotte, NC (US)

(72) Inventors: Christina Willis, Plano, TX (US); Donald Davis, Somerville, MA (US); Russell Andrew Kamola, Camarillo, CA (US)

(73) Assignee: Bank of America Corporation, Charlotte, NC (US)

( * ) Notice: Subject to any disclaimer, the term of this patent is extended or adjusted under 35 U.S.C. 154(b) by 181 days.

(21) Appl. No.: 17/011,494

(22) Filed: Sep. 3, 2020

(65) Prior Publication Data

US 2022/0070198 A1    Mar. 3, 2022

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC ............ H04L 63/1433; H04L 63/1441; H04L 63/1416; H04L 63/1425; H04L 63/20; G06F 21/577; G06F 2221/034; H04W 12/01

See application file for complete search history.

(56) References Cited

U.S. PATENT DOCUMENTS

| | | | |
|---|---|---|---|
| 7,526,807 | B2 | 4/2009 | Chao et al. |
| 7,594,270 | B2 | 9/2009 | Church et al. |
| 7,930,256 | B2 | 4/2011 | Gonsalves et al. |
| 8,191,139 | B2 | 5/2012 | Heimerdinger et al. |
| 8,191,149 | B2 | 5/2012 | Yun et al. |
| 8,209,759 | B2 | 6/2012 | Newton et al. |
| 8,689,336 | B2 | 4/2014 | Brock et al. |
| 9,241,008 | B2 | 1/2016 | Powell et al. |
| 9,350,749 | B2 | 5/2016 | Hebert et al. |
| 9,503,472 | B2 | 11/2016 | Laidlaw et al. |

(Continued)

OTHER PUBLICATIONS

Yang et al., "Improving vulnerability prediction accuracy with Secure Coding Standard violation measures," 2016 International Conference on Big Data and Smart Computing (BigComp) Year: 2016 | Conference Paper | Publisher: IEEE.*

(Continued)

*Primary Examiner* — Roderick Tolentino
(74) *Attorney, Agent, or Firm* — Banner & Witcoff, Ltd.

(57) ABSTRACT

Aspects of the disclosure relate to quantification of attack surfaces in an enterprise computing system. A computing platform may receive indications of usage of a plurality of controls associated with an enterprise computing system. The computing platform may determine, based on a mapping between the plurality of controls and a plurality of attack vectors, one or more controls of the plurality of controls that are mapped to an attack vector. The computing platform may determine respective compliance scores of the one or more controls, and determine, based on the respective compliance scores, a vulnerability score associated with the attack vector. The computing platform may transmit an indication of the determined vulnerability score associated with the attack vector.

18 Claims, 7 Drawing Sheets

(56) References Cited

U.S. PATENT DOCUMENTS

| | | | |
|---|---|---|---|
| 9,680,855 B2 | 6/2017 | Schultz et al. | |
| 9,749,344 B2 | 8/2017 | Watters et al. | |
| 9,807,109 B2 | 10/2017 | Laidlaw et al. | |
| 9,930,061 B2 | 3/2018 | Zandani | |
| 10,142,363 B2 | 11/2018 | Carter | |
| 10,425,429 B2 | 9/2019 | Bassett | |
| 2017/0213037 A1* | 7/2017 | Toledano | H04L 63/06 |
| 2019/0036958 A1 | 1/2019 | Shi | |
| 2019/0258804 A1* | 8/2019 | Glenn | H04L 63/1425 |
| 2019/0281082 A1* | 9/2019 | Carmichael | G06F 21/577 |
| 2020/0267183 A1* | 8/2020 | Vishwanath | H04L 63/1483 |
| 2020/0287888 A1* | 9/2020 | Moore | H04L 63/0227 |
| 2020/0310889 A1* | 10/2020 | Levin | H04L 63/0263 |
| 2021/0226779 A1* | 7/2021 | Ruane | G06F 9/321 |
| 2021/0377288 A1* | 12/2021 | Chen Kaidi | G06N 5/04 |
| 2022/0050896 A1* | 2/2022 | Ahmed | G06F 21/552 |
| 2022/0101326 A1* | 3/2022 | Kim | H04L 9/50 |

OTHER PUBLICATIONS

Keskin et al., "Scoring Cyber Vulnerabilities based on Their Impact on Organizational Goals," 2021 Systems and Information Engineering Design Symposium (SIEDS) Year: 2021 | Conference Paper | Publisher: IEEE.*

* cited by examiner

Security Questionnaire

Q1. Please select the password protection features used in your system:

☒ Password monitoring ☒ IP address logging ☐ Password policies ☒ Password recycling ☐ Two-factor authentication

Q2. When was the last time your team members were trained in best practices for email security?

○ Within the last quarter ● Within the last year ○ More than a year ago ○ Not trained

Q3. How often do you perform security updates for your system?

○ Once a week ● Once a month ○ Once a quarter ○ Not updated

Q4. How often do you perform system inventory?

○ Once a week ● Once a month ○ Once a quarter ○ Not performed

Q5. On a scale of 0-5, with 5 being the highest score, how would you rate your security processes/features for client data protection?

○ 0 ○ 1 ○ 2 ○ 3 ○ 4 ○ 5 ● Don't know

Q6. Is your client-facing interface secured by DDoS protection services? If so, list out the protection service(s) used.

☒ Yes ☐ No    Service(s) used: [_____]

*Submit*

FIG. 4

DETECTING AND QUANTIFYING VULNERABILITIES IN A NETWORK SYSTEM

FIELD

Aspects described herein generally relate to cyber security and more specifically to techniques for quantifying vulnerabilities in networked systems.

BACKGROUND

Enterprise organizations may be susceptible to attacks intended to gain unauthorized access for malicious purposes (e.g., financial gain, disruption, espionage, etc.). Malicious attacks may use one or more attack vectors (e.g., compromised passwords, phishing attacks, viruses, trojans, adwares, malwares, ransomwares, etc.) for targeting specific hardware and/or software components in an asset (e.g., application, device, and/or system) of an enterprise organization. An attack surface may be a set of vulnerabilities that may be used for unauthorized access to one or more assets. Determination of attack surfaces may enable an enterprise organization to identify assets that may vulnerable to attacks, and ensure timely and targeted remediation measures are taken to bolster cyber defense. This may enable the organization to minimize impact to enterprise services and prevent cyber security threats. Enterprise organizations may use one or more security control systems/protocols to protect against malicious attacks. In light of potentially large numbers of attack vectors and security controls used to mitigate the attack vectors, it may be challenging to determine an overall measure of vulnerability to the enterprise organization and/or identify which particular assets are vulnerable. Further, different assets may be vulnerable to different attack vectors and may be associated with different security controls making quantitative determination of vulnerabilities for each asset challenging.

SUMMARY

Aspects of the disclosure provide efficient, scalable, and flexible technical solutions that address and overcome problems associated with quantifying attack surfaces. In particular, one or more aspects of the disclosure relate to determination and utilization of vulnerability scores based on attack vectors, and control mechanisms intended to reduce vulnerabilities targeted by the attack vectors.

In accordance with one or more arrangements, a computing platform having at least one processor, a communication interface, and memory may receive, via the communication interface and from a computing device, indications of usage of a plurality of controls associated with an enterprise computing system. The computing platform may identify, based on a mapping between the plurality of controls and a plurality of attack vectors, one or more controls of the plurality of controls that are mapped to an attack vector. The computing platform may determine, based on indications of usage of the one or more controls, respective compliance scores of the one or more controls. Further, the computing platform may determine, based on the respective compliance scores, a vulnerability score associated with the attack vector. The computing platform may transmit, via the communication interface to the computing device, an indication of the determined vulnerability score associated with the attack vector.

In some arrangements, the enterprise computing system may comprise a plurality of sub-systems. The attack vector may target one or more sub-systems within the plurality of sub-systems.

In some examples, the computing platform may determine respective effectiveness scores of controls that are mapped to the attack vector, wherein the determining the vulnerability score associated with the attack vector may be based on the respective effectiveness scores and the respective compliance scores.

In some instances, an effectiveness score of a control may be a quantity between 0 and 1; and a compliance score of a control may be a quantity between 0 and 1.

In some arrangements, an effectiveness score of a control mapped to an attack vector may be proportional to an effectiveness of the control at protecting the enterprise computing system from an attack using the attack vector.

In some example arrangements, the determining the vulnerability score may comprise determining a sum of products of the respective compliance scores and the respective effectiveness scores.

In some examples, a compliance score of zero may indicate that a control is not used at the enterprise computing system.

In some arrangements, a compliance score that is greater than zero may indicate that a control is used at the enterprise computing system.

In some examples, the computing platform may determine the compliance score of the control based on: a total quantity of protocols associated with the control; and a quantity of protocols, among the protocols associated with the control, used at the enterprise computing system.

In some arrangements, the computing platform may compare the determined vulnerability score with a threshold vulnerability score. If the determined vulnerability score is lower than the threshold vulnerability score, the computing platform may transmit, via the communication interface to the computing device, an indication that the one or more controls are not compliant.

In some arrangements, the computing platform may determine, based on the mapping, one or more additional controls mapped to the attack vector, wherein the one or more additional controls are not being used at the enterprise computing system. The computing platform may transmit, via the communication interface to the computing device, an indication of the one or more additional controls.

In some example arrangements, the one or more additional controls may comprise at least one control among the one or more controls.

In some examples, the determining the vulnerability score may be based on a quantity of the one or more controls that are mapped to the attack vector.

In some arrangements, the computing platform may determine one or more additional vulnerability scores associated with one or more other attack vectors among the plurality of attack vectors. The computing platform may determine an aggregate vulnerability score based on the vulnerability score of the attack vector and the one or more other additional vulnerability scores associated with the one or more other attack vectors. The computing platform may send, to the computing device an indication of the aggregate vulnerability score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 shows an example graphical user interface (GUI) for a security questionnaire for determining controls in an enterprise system, in accordance with one or more example arrangements;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise organizations may be vulnerable to a variety internal and external cyber security threats. For example, there may be threats from malicious campaigns targeting an enterprise and/or a wider industry sector, direct threats to an enterprise organization or a geographic region, and so forth. Also, for example, an enterprise organization, such as a financial institution, may be vulnerable to malicious campaigns targeting customer assets and/or confidential information. The enterprise organization may be associated with multiple different systems, each with a different functionality and/or a different service as provided to an end-user and/or a client. For example, a financial institution may maintain different systems corresponding to online banking, money transfers, credit cards, loans, and the like. Each of the different systems may be associated with different vulnerabilities and may use different protective features. Accordingly, quantification of vulnerabilities associated with individual systems may be beneficial for the enterprise organization for comparing vulnerabilities across different systems in a standardized manner. This may enable the enterprise organization to determine specific assets that may need additional controls and specific attack vectors to which the assets may be vulnerable. This determination may enable the enterprise organization to allocate protective resources accordingly and/or improve existing controls to better protect systems that are deemed to be more vulnerable.

Figure 1A:
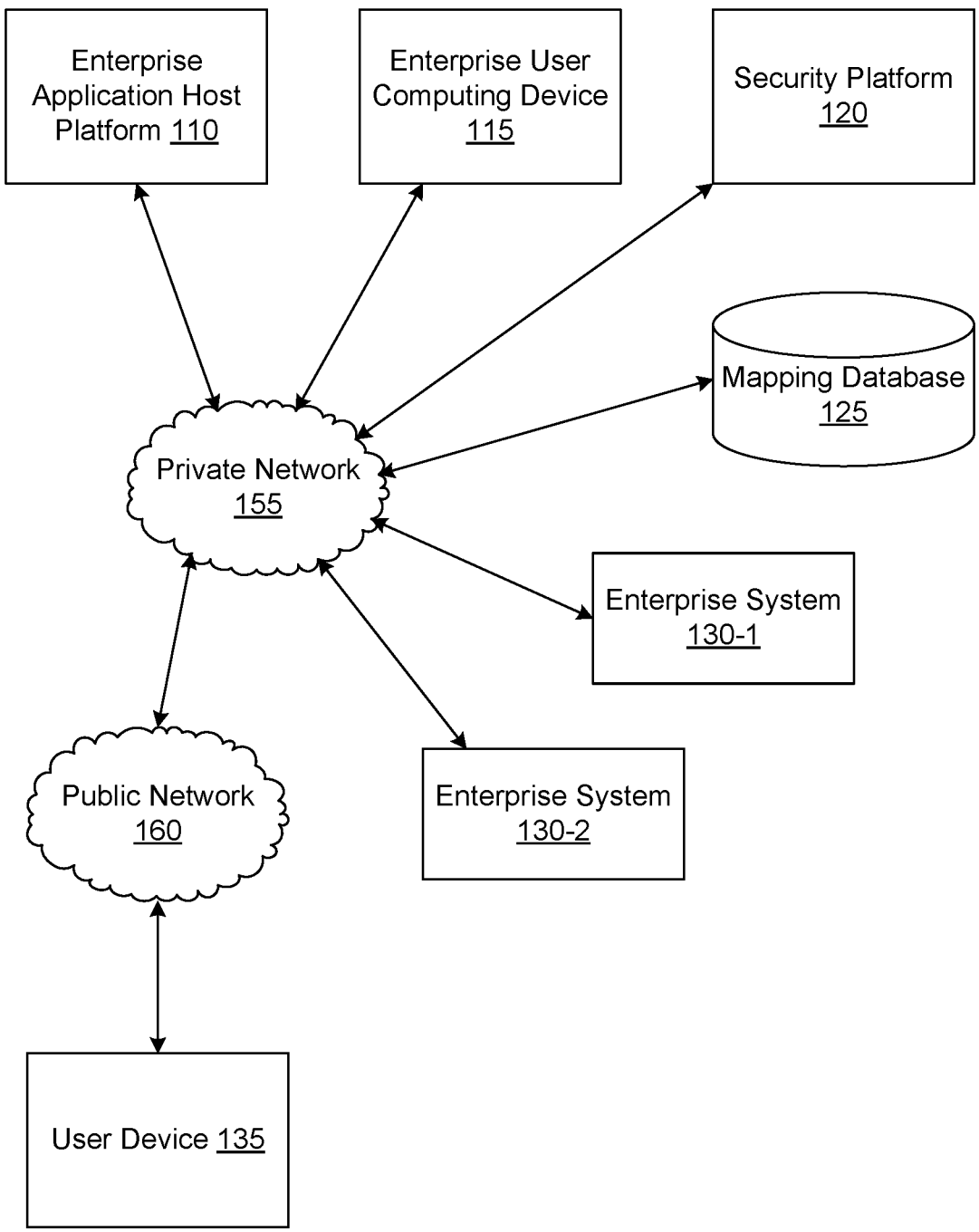
FIGS. 1A and 1B depict an illustrative computing environment for quantifying attack surfaces, in accordance with one or more example arrangements.
Figure 1B:
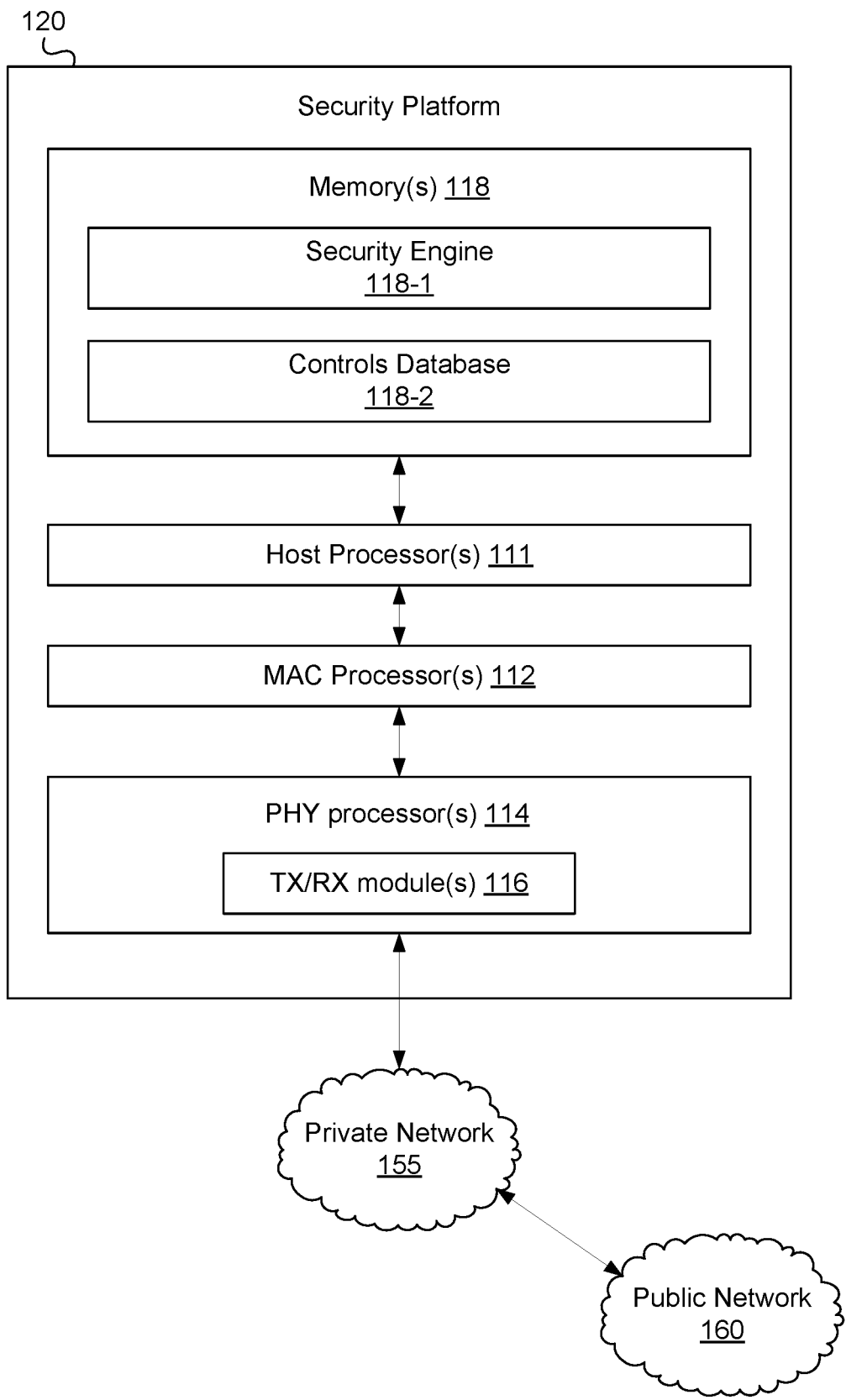

Various examples herein provide a mechanism for quantification of vulnerabilities based on attack vectors that may be used to target an enterprise computing system and available controls that may be used to protect the system. A security platform may receive indications of usage of a plurality of controls associated with an enterprise computing system. The security platform may determine, based on a mapping between the plurality of controls and a plurality of attack vectors, one or more controls of the plurality of controls that are mapped to an attack vector. The security platform may determine respective compliance scores of the one or more controls, and determine, based on the respective compliance scores, a vulnerability score associated with the attack vector. The security platform may transmit, via the communication interface to the computing device, an indication of the determined vulnerability score associated with the attack vector FIGS. 1A and 1B show an illustrative computing environment 100 for quantifying attack surfaces, in accordance with one or more arrangements. The computing environment 100 may comprise one or more devices (e.g., computer systems, communication devices, and the like). The computing environment 100 may comprise, for example, an enterprise application host platform 110, an enterprise user computing device 115, a security platform 120, a mapping database 125, one or more enterprise systems 130. The one or more of the devices and/or systems, may be linked over a private network 155 associated with the enterprise organization. The computing environment 100 may additionally comprise a user device 135 connected, via a public network 160, to the devices in the private network 155. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The enterprise application host platform 110 may comprise one or more computing devices and/or other computer components (e.g., processors, memories, communication interfaces). In addition, the enterprise application host platform 110 may be configured to host, execute, and/or otherwise provide one or more enterprise applications. For example, the enterprise application host platform 110 may be configured to host, execute, and/or otherwise provide one or more transaction processing programs, such as an online banking application, loan application processing programs, and/or other programs associated with an enterprise organization, such as a financial institution. In some instances, the enterprise application host platform 110 may be configured to provide various enterprise and/or back-office computing functions for an enterprise organization, such as a financial institution. For example, the enterprise application host platform 110 may comprise various servers and/or databases that store and/or otherwise maintain account information, such as financial account information including account balances, transaction history, account owner information, and/or other information. In addition, the enterprise application host platform 110 may process and/or otherwise execute transactions on specific accounts based on commands and/or other information received from other computer systems comprising the computing environment 100.

The enterprise user computing device 115 may be a personal computing device (e.g., desktop computer, laptop computer) or mobile computing device (e.g., smartphone, tablet). In addition, the enterprise user computing device 115 may be linked to and/or operated by a specific enterprise user (who may, for example, be an employee or other affiliate of the enterprise organization).

The computing environment 100 may comprise one or more enterprise systems 130 (e.g., enterprise system 130-1, enterprise system 130-2, etc.). The one or more enterprise systems 130 may comprise applications, servers, and/or databases (hereinafter referred to as assets) that facilitate operations of one or more functionalities and/or services provided by the one or more enterprise systems 130. For example, if the enterprise organization is a financial institution, the enterprise system 130-1 may comprise assets that facilitate an online banking system associated with the financial institution; and the enterprise system 130-2 may comprise assets that facilitate an online money transfer system associated with the financial institution, and the like. In an arrangement, the enterprise application host platform 110 may be a platform associated with an enterprise system of the one or more enterprise systems 130.

The mapping database 125 may comprise one or more storage mediums storing a mapping between various attack vectors (that may be used to target enterprise systems) and controls used at the enterprise system to protect against the attack vectors. For example, the mapping database 125 may store indications of respective attack vectors and respective controls intended to defend the enterprise systems 130 against the respective attack vectors. As further described herein, the mapping database 125 may store effectiveness scores for each control for defending against specific attack vectors. The mapping database 125 may comprise one or more electronic memory devices such as tape drives, hard disk drives, optical disks, removable storage media, solid-state memory, RAM, and the like.

The user device 135 may be a computing device (e.g., desktop computer, laptop computer) or mobile computing device (e.g., smartphone, tablet). The user device 135 may be configured to enable the user to access the various functionalities provided by the devices, applications, and/or systems in the private network 155.

In one or more arrangements, the enterprise application host platform 110, the enterprise user computing device 115, the security platform 120, the mapping database 125, the one or more enterprise systems 130, the user device 135, and/or the other devices/systems in the computing environment 100 may be any type of computing device capable of receiving input via a user interface, and communicating the received input to one or more other computing devices in the computing environment 100. For example, the enterprise application host platform 110, the enterprise user computing device 115, the security platform 120, the mapping database 125, the one or more enterprise systems 130, the user device 135, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. In one or more arrangements, the enterprise application host platform 110, the enterprise user computing device 115, the security platform 120, the mapping database 125, the one or more enterprise systems 130, the user device 135, and/or the other devices/systems in the computing environment 100 may be any type of display device, audio system, wearable devices (e.g., a smart watch, fitness tracker, etc.). Any and/or all of the enterprise application host platform 110, the enterprise user computing device 115, the security platform 120, the mapping database 125, the one or more enterprise systems 130, the user device 135, and/or the other devices/systems in the computing environment 100 may, in some instances, be and/or comprise special-purpose computing devices configured to perform specific functions.

FIG. 1B shows an example security platform 120 in accordance with one or more examples described herein. The security platform 120 may comprise one or more of host processor(s) 111, medium access control (MAC) processor(s) 112, physical layer (PHY) processor(s) 114, transmit/receive (TX/RX) module(s) 116, memory 118, and/or the like. One or more data buses may interconnect host processor(s) 111, MAC processor(s) 112, PHY processor(s) 114, and/or Tx/Rx module(s) 116, and/or memory 118. The security platform 120 may be implemented using one or more integrated circuits (ICs), software, or a combination thereof, configured to operate as discussed below. The host processor(s) 111, the MAC processor(s) 112, and the PHY processor(s) 114 may be implemented, at least partially, on a single IC or multiple ICs. Memory 118 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 112 and/or the PHY processor(s) 114 of the security platform 120 may be configured to generate data units, and process received data units, that conform to any suitable wired and/or wireless communication protocol. For example, the MAC processor(s) 112 may be configured to implement MAC layer functions, and the PHY processor(s) 114 may be configured to implement PHY layer functions corresponding to the communication protocol. The MAC processor(s) 112 may, for example, generate MAC data units (e.g., MAC protocol data units (MPDUs)), and forward the MAC data units to the PHY processor(s) 114. The PHY processor(s) 114 may, for example, generate PHY data units (e.g., PHY protocol data units (PPDUs)) based on the MAC data units. The generated PHY data units may be transmitted via the TX/RX module(s) 116 over the private network 155. Similarly, the PHY processor(s) 114 may receive PHY data units from the TX/RX module(s) 114, extract MAC data units encapsulated within the PHY data units, and forward the extracted MAC data units to the MAC processor(s). The MAC processor(s) 112 may then process the MAC data units as forwarded by the PHY processor(s) 114.

One or more processors (e.g., the host processor(s) 111, the MAC processor(s) 112, the PHY processor(s) 114, and/or the like) of the security platform 120 may be configured to execute machine readable instructions stored in memory 118. The memory 118 may comprise (i) one or more program modules/engines having instructions that when executed by the one or more processors cause the security platform 120 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the security platform 120 and/or by different computing devices that may form and/or otherwise make up the security platform 120. For example, the memory 118 may have, store, and/or comprise a security engine 118-1, and a controls database 118-2. The security engine 118-1 may have instructions that direct and/or cause the security platform 120 to perform one or more operations of the security platform 120 as discussed herein. The controls database 118-2 may store vulnerability scores as may be determined by the security platform 120. In some arrangements, the controls database 118-2 may comprise the mapping database 125. In some arrangements, the controls database 118-2 may store other information associated with the attack vectors (e.g., risk scores, impact scores as further described herein).

While FIG. 1A illustrates the enterprise application host platform 110, the enterprise user computing device 115, the security platform 120, the mapping database 125, and the one or more enterprise systems 130 as being separate elements connected in the private network 155, in one or more other arrangements, functions of one or more of the above may be integrated in a single device/network of devices. For example, elements in the security platform 120 (e.g., host processor(s) 111, memory(s) 118, MAC processor(s) 112, PHY processor(s) 114, TX/RX module(s) 116, and/or one or more program//modules stored in memory(s) 118) may share hardware and software elements with and corresponding to, for example, the enterprise application host platform 110, the enterprise user computing device 115, the security platform 120, the mapping database 125, and the one or more enterprise systems 130.

Figure 2:
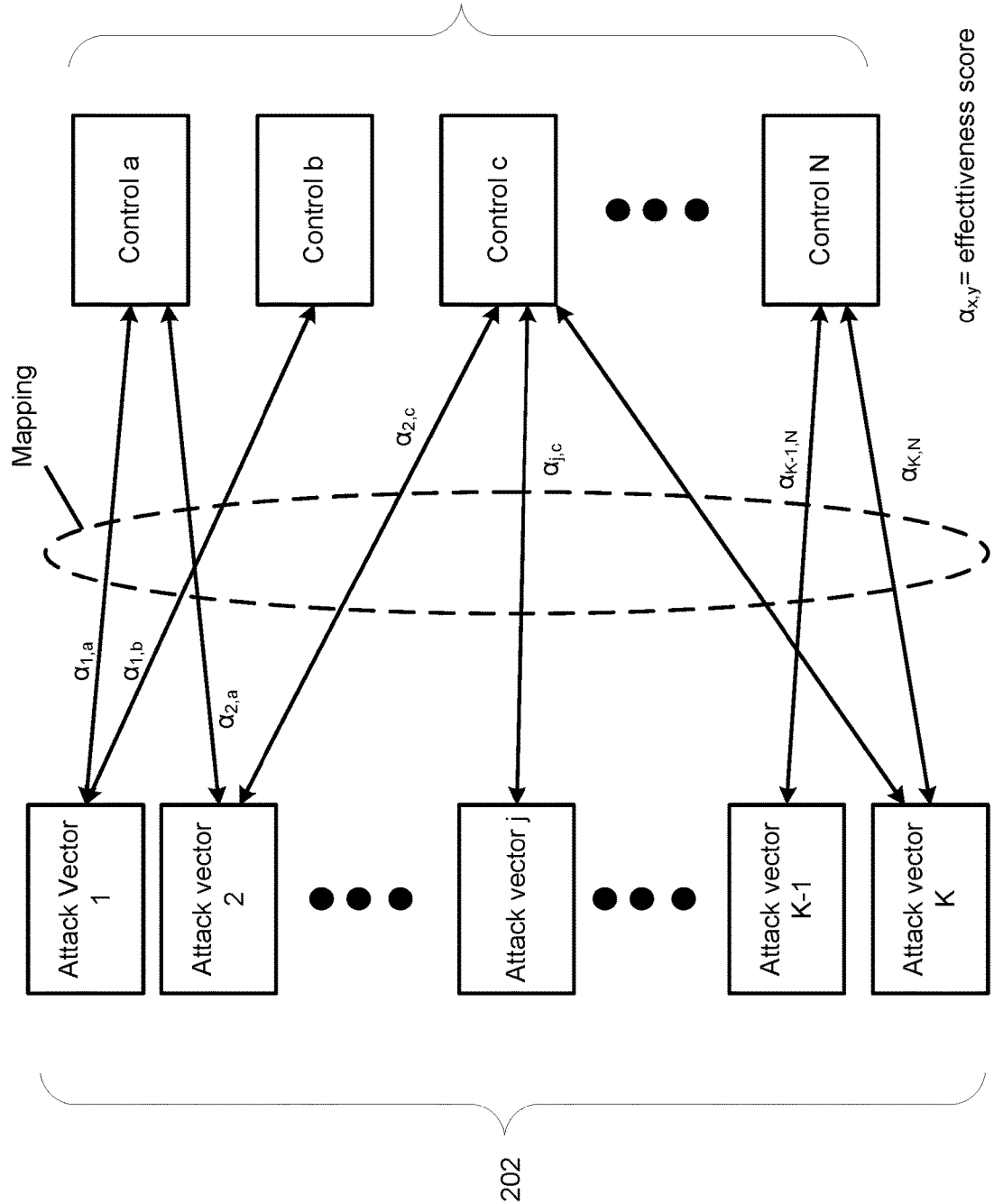
FIG. 2 shows an example mapping between attack vectors that may be used to target an enterprise system and controls that may be used to protect the enterprise system against the attack vectors, in accordance with one or more example arrangements.

FIG. 2 shows an example mapping between attack vectors 202 that may be used to target an enterprise system (e.g., among the one or more enterprise systems 130) and controls 204 that may be used to protect the enterprise system against the attack vectors. The enterprise system may be vulnerable to K attack vectors and may comprise N controls. Each of the attack vectors may be associated with (e.g., target) one or more sub-systems corresponding to the enterprise system. The mapping between attack vectors 202 and the controls 204 may be a many-to-many mapping, a one-to-many mapping, or a many-to-one mapping. The mapping between attack vectors 202 and the controls 204 may comprise a first quantity of attack vectors 202 (e.g., 50, 100, 200, etc.) mapped to a second quantity of controls 204 (e.g., 50, 100, 200, etc.). The mapping may be stored in the mapping database 125.

The attack vectors 202 may include, but are not limited to, compromised passwords, phishing/spear phishing attacks, parameter injection attacks, malicious insiders, malwares, ransomwares, and/or any other attack vector/vulnerability that may be used to gain malicious access to and/or compromise operation of the enterprise system. The controls 204 may comprise hardware and/or software components, and/or may correspond to various security practices, protocols, and/or mechanisms used at the enterprise organization for cyber security. The controls 204 may include, but are not limited to, two-factor authentication systems, encryption systems, network monitoring systems, email filtering systems, distributed denial of service (DDoS) protection systems, employee training, security/monitoring protocols, anti-virus applications, anti-malware applications, and/or any other control that may be used to protect the enterprise system. The attack vectors 202 and associated controls 204 may be based on data collated by various organizations involved in the field of cyber security (e.g., MITRE corporation, National Institute of Standards and Technology (NIST), etc.).

The mapping may indicate, for each attack vector, corresponding controls that may be used in the enterprise system to defend against an attack via the attack vector. For example, as shown in FIG. 2, controls a and b may be used to secure the enterprise system from attack vector 1, controls a and c may be used to secure the enterprise system from attack vector 2, etc. The mapping may be determined and/or updated based on an input by an enterprise user associated with the enterprise organization (e.g., via the enterprise user computing device 115). The mapping may be customized based on various considerations including, but not limited to, functions of the enterprise system, sub-systems associated with the enterprise system, characteristics corresponding to the attack vectors 202 and/or the controls 204, etc.

Each mapping of an attack vector x to a control y may be associated with an effectiveness score/relevancy score $\alpha_{x,y}$ that indicates whether the control y is effective and/or relevant for preventing attacks using the attack vector x. For example, a first value of an effectiveness score (e.g., 1, or any other value) may indicate that a control is an effective defense against an attack vector. A second value of an effectiveness score (e.g., 0, or any other value) may indicate that the control is not an effective defense against the attack vector. Additionally, or alternatively, the effectiveness score may be any value in a range of values (e.g., a value between 0 and 1). For example, a control may be partially relevant to secure the enterprise system against an attack vector (e.g., protect against at least some aspects of the attack vector). The partial relevancy may be indicated by an effectiveness score that is greater than 0 but less than 1, with a higher score indicating a higher relevancy/effectiveness against the attack vector.

As an example, if the enterprise system is an email system, an anti-spam system may partially (but not completely) protect against phishing attacks. The effectiveness score of the anti-spam filter against a phishing attack may accordingly be assigned a value that is between 0 and 1 (e.g., 0.2, 0.5, or any other value). As another example, the enterprise organization may use multiple anti-virus applications for defending against viruses. A first anti-virus application may scan attachments in an email before they are downloaded and executed, while the second anti-virus application may periodically scan a device/system to detect viruses. The first anti-virus application may be deemed to be more effective at protecting the enterprise system and may be assigned a score of 0.9 (or any other first value), while the second anti-virus application may be deemed to be less effective and assigned a value of 0.4 (or any other second value that is less than the first value). As yet another example, if a control is a firewall application, a version number of the application may be considered to determine an effectiveness score of the application. For instance, a more updated version of the application may be assigned a higher effectiveness score than prior versions of the application. The effectiveness scores may be determined and/or updated based on an input by an enterprise user associated with the enterprise organization (e.g., via the enterprise user computing device 115). Additionally, or alternatively, effectiveness scores may be determined by the security platform 120 based on an analysis of the controls 204. Various attributes associated with a control (e.g., whether a control is a hardware control or a software control, whether a control is a custom-designed system/application or provided by an external vendor, a version number of a control, an update status of the control, etc.) may be used to determine an effectiveness score associated with the control.

Each control y may be associated with a corresponding compliance score $\beta_y$. A compliance score may indicate whether a control is being used at the enterprise system and/or how compliant an enterprise system is with best protocols/practices associated with a control. A first value of a compliance score (e.g., 1) may indicate that a control is being used at the enterprise system and/or that the enterprise system is fully compliant with the best protocols/practices associated with the control. A second value of a compliance score (e.g., 0) may indicate that a control is not being used at the enterprise system.

An enterprise system may be partially compliant with respect to the use of a control to secure the enterprise system against an attack vector, and may have a compliance score between 0 and 1 (e.g., with a higher score indicating a higher compliance). A control may be associated with a plurality of protocols/practices/features for securing the enterprise system. A control may be an application that may be associated with a plurality of features that may be used for securing the enterprise system. A compliance score of a control may be determined based on a quantity of protocols/practices/features (among a plurality of protocols/practices/features associated with the control) being used at the enterprise system. For example, the compliance score may be a ratio of the quantity of protocols/practices/features used and a total quantity of protocols/practices/features associated with the control.

For example, a control may be an application/system to protect against DDoS attacks and may comprise multiple features that may be selected for implementation. Using a higher number of features may result in better security and may be associated with a higher compliance score. As another example, a control may be inventorying devices/systems within the enterprise organization (e.g., which may be mapped to a parameter injection attack vector) and may comprise multiple practices/protocols that may be implemented. Implementing a higher number of protocols/practices for inventorying may be associated with a higher compliance score. Any feature in a control that is not applicable for the enterprise system may not be used for determining a compliance score for the control.

Consider an example where an attack vector is a password brute-forcing attack vector wherein an attacker uses a list of commonly used passwords and tries every single one of them to attempt to gain access to the enterprise system. A possible control that may be mapped to the attack vector to prevent password brute-forcing may be implementing password controls. Password controls may comprise the following practices/protocols: using password monitoring (where the enterprise system increases a time duration between successive attempts to access the system if a password is determined to be invalid), logging internet protocol (IP) address(es) generally used by an authorized user to gain access to the enterprise system, using a password policy to prevent authorized users from using commonly used passwords, implementing a password recycling system where users are directed to change passwords after a given period of time, and using automated systems to generate strong passwords. If the enterprise system uses two of the four possible protocols, the compliance score may be determined to be equal to 0.5 (or 50%).

Compliance scores may be determined and/or updated based on an input by an enterprise user associated with the enterprise organization (e.g., via the enterprise user computing device 115). Additionally, or alternatively, the security platform 120 may scan computing devices and or applications associated with the enterprise system to determine compliance scores associated with various controls used in the enterprise system. For example, responsive to determining that a control is not used, the security platform 120 may designate a compliance score of the control as zero. Responsive to determining that a control is used, the security platform 120 may designate a compliance score of the control as non-zero (e.g., 1, or a value between 0 and 1 using one or more criteria described herein).

A vulnerability score $v_x$ for an attack vector x may be determined based on the effectiveness score $\alpha_{x,y}$ and/or the compliance score $\beta_y$ of the control y mapped to attack vector x. For example, the vulnerability score may be proportional to a product of the effectiveness score and/or the compliance score. If multiple controls map to an attack vector, the vulnerability score may be determined based on respective effectiveness scores and/or the compliance scores of each of the multiple controls. For example, $$v_x = \sum_{i=1}^{n} \alpha_{x,i} \beta_i \qquad \text{Equation (1)}$$

where the attack vector x may be mapped to n controls. A higher value of $v_x$ may indicate a lower vulnerability of the enterprise system to the attack vector x. Returning to the example of password brute-forcing attack vector, if the effectiveness score of the password controls is set to 1, the vulnerability score may be determined to be equal to 0.5 (or 50%).

A maximum value of $v_x$ may be a function of a number of controls that may be mapped to an attack vector x. Mapping of an attack vector to a large number of controls may result in a higher maximum possible score than a score of an attack vector that is mapped to a fewer number of controls. This may provide misleading results where an enterprise system may be determined to be more vulnerable to an attack vector in relation to other attack vectors when in reality that might not necessarily be the case. For example, consider an arrangement in which an attack vector 1 is mapped to four controls and an attack vector 2 is mapped to eight controls. The maximum vulnerability score for attack vector 1 may be 4, while the maximum vulnerability score for attack vector 2 may be 8 (assuming full compliance of all controls and assuming that all controls are fully relevant for the attack vectors). Simply analyzing the vulnerability scores may lead to a misleading interpretation that the enterprise system is more vulnerable to attack vector 1 while in reality both may be sufficiently covered (e.g., as per organization determined security protocols and practices).

Weighting may be used normalize vulnerability scores. For example, a weighted vulnerability score $v_{x,weighted}$ may be equal to a ratio of a determined vulnerability score and a maximum possible score that may be obtained for an attack vector or a number of controls that may be mapped to the attack vector. The maximum possible score may be equal to a score that may be obtained if all controls mapped to the attack vector are being used. For example, $$v_{x,weighted} = \frac{v_x}{\sum_{i=1}^{n} \alpha_{x,i}} \qquad \text{Equation (3)}$$

Additional factors that may be used to determine the vulnerability scores may be a risk score $r_x$ and/or an impact score $i_x$ associated with a particular attack vector x. A risk score may quantify a risk of an enterprise system to an attack vector, while an impact score may quantify a damage that may be done to the enterprise vector in an event of a successful attack via the attack vector. The vulnerability score $v_x$ may be a function of effectiveness scores, vulnerability scores, the risk score, and the impact score. For example, $$v_x = r_x i_x \frac{\sum_{i=1}^{n} \alpha_{x,i} \beta_i}{\sum_{i=1}^{n} \alpha_{x,i}} \qquad \text{Equation (3)}$$

The risk scores and the impact scores may be stored in the mapping database 125 or may be stored in the memory 118 of the security platform 120.

The security platform 120 may determine an aggregate vulnerability score for the enterprise system based on vulnerability scores of attack vectors that may be used to target the enterprise system. For example, the aggregate vulnerability score may be equal to a sum of vulnerability scores corresponding to the attack vectors. A higher value of the aggregate vulnerability score may indicate a lower vulnerability of the enterprise system to the attack vectors. The security platform may determine a combined vulnerability score associated with the private network 155 by combining aggregated vulnerability scores associated with all enterprise systems in the private network 155. For example, the combined vulnerability score may be equal to a sum of aggregated vulnerability scores.

An attack vector may be associated with a large number of possible controls and it may be difficult to determine compliance scores associated with each of the possible controls. For example, this may require a system administrator associated with a system to manually check and provide compliance scores of dozens of controls or features/protocols associated with the controls. As another example, it may be difficult to determine whether a particular control or protocol associated with the control has been implemented in the enterprise system. To simplify the process, the control might not be used for calculating the vulnerability score. If a vulnerability score of the attack vector is determined to be low (e.g., lower than a threshold, lower than other attack vectors), usage and compliance of the control may be determined to revise the vulnerability scores. This may reduce the burden on an enterprise user for determining compliance associated with each of the controls that may be mapped to an attack vector.

Figure 3:
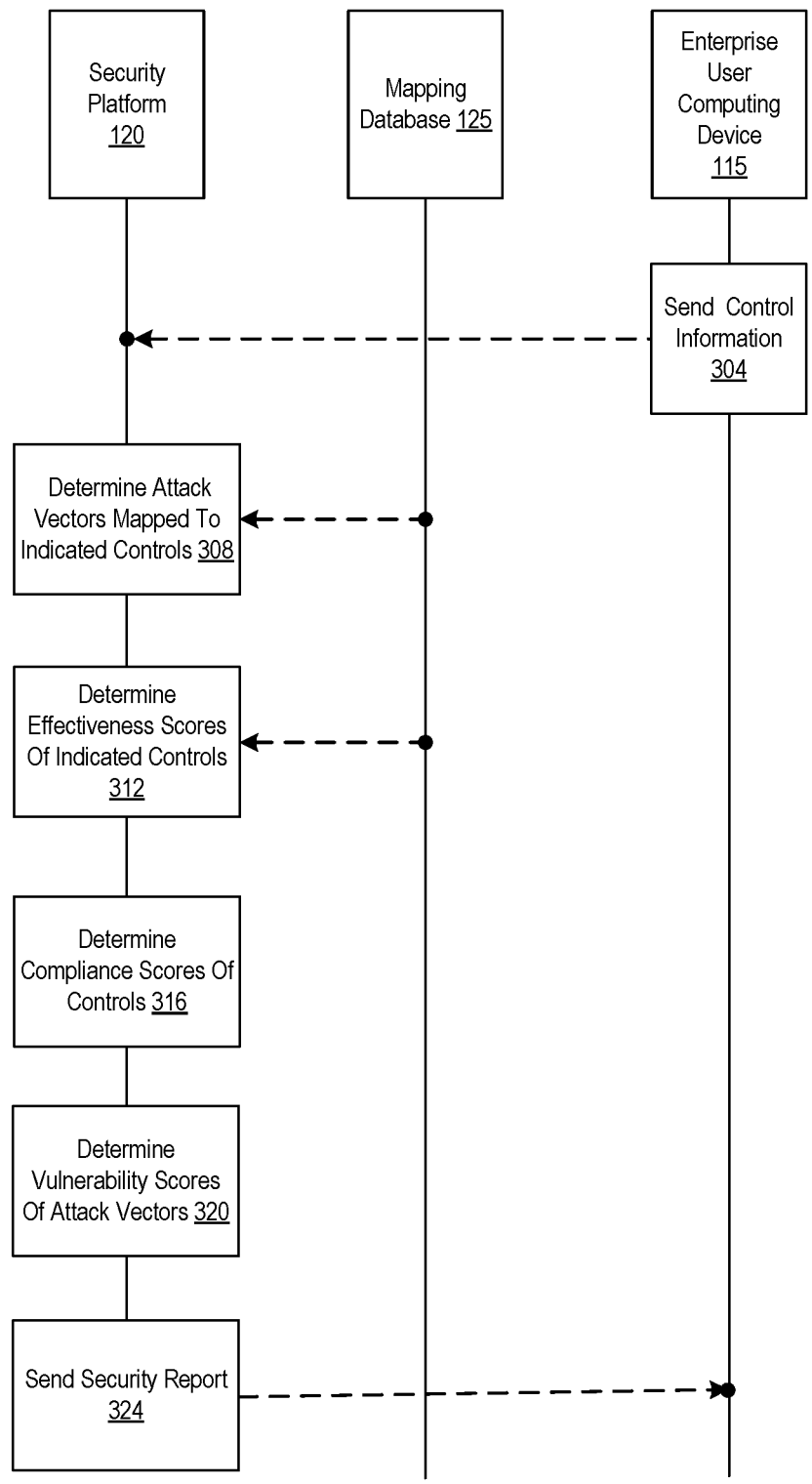
FIG. 3 shows an example event sequence for determining and sending vulnerability scores associated with attack vectors of an enterprise system, in accordance with one or more example arrangements.

FIG. 3 shows an example event sequence 300 for determining and sending vulnerability scores associated with attack vectors of an enterprise system. At step 304, the enterprise user computing device 115 may send, to the security platform 120, control information comprising an indication of a usage of controls at an enterprise system. An indication of a usage of a control may comprise an indication of whether or not the control (or one or more features/protocols associated with the control) is being used. For example, the control information may comprise indications of usage of security applications/systems, update status of the various security applications/systems, usage of protocols associated with a control, usage of features associated with a control, usage of security services, version number of a control, and/or the like. Each of the controls may be associated with best practices/protocols (e.g., as may be defined by the enterprise organization) and the control information may indicate a degree to which the practice/protocols are being complied with at the enterprise system.

The control information may be determined based on a user input at the enterprise user computing device 115. For example, a system administrator may be provided with a security questionnaire (e.g., via the enterprise user computing device may 115) requesting details associated with the various controls used at the enterprise system. FIG. 4 shows an example graphical user interface (GUI) for a security questionnaire 400 that may be provided to a system administrator (e.g., via the enterprise user computing device 115) associated with the enterprise system. The control information may be based on responses to the security questionnaire 400. Additionally, or alternatively, at least some aspects of the control information may be automatically determined by the security platform. For example, the security platform 120 may scan computing devices associated with the enterprise system to detect applications/systems that are being used to provide security functions, and associated features associated with the applications/systems.

At step 308, the security platform 120 may determine attack vectors mapped to the controls indicated in the control information. The security platform 120 may use a mapping between the controls and the attack vectors (e.g., as shown in FIG. 2) to determine attack vectors that are mapped to the controls. The security platform 120 may transmit and/or receive one or more messages from the mapping database 125 to determine the attack vectors. The mapping may be associated with the enterprise system and may be based on the attack vectors generally used to target the enterprise system and the controls that may be used to mitigate the attack vectors.

For example, a control corresponding to the received control information may include using password protection features (e.g., password monitoring, IP address logging, password policies, password recycling, two-factor authentication, etc.) for the enterprise system. The password protection features may be mapped to the password brute-force attack vector. The security platform 120 may determine the password brute-force attack vector based on an indication of a usage of password protection features in the control information and the mapping between the password protection features and password brute-force attack vector as stored in the mapping database 125. The password protection features may additionally be mapped to other attack vectors in a many-to-many mapping. For example, the password protection features may be mapped to an attack vector that uses stolen passwords to gain unauthorized access.

At step 312, the security platform 120 may determine effectiveness scores associated with the controls as indicated in the control information. A control may be mapped to a plurality of attack vectors and each mapping may be associated with a different effectiveness score. For example, control corresponding to the use of password protection features may be mapped to both the brute-force attack vector and the attack vector using stolen passwords. Effectiveness scores of the control may be different for each of the two attack vectors. The effectiveness scores may be stored in the mapping database 125, and the security platform 120 may determine the effectiveness scores based on looking up the mapping database 125. In other examples, the security platform 120 may determine the effectiveness scores based on attributes associated with the controls (e.g., whether a control is a hardware control or a software control, whether a control is a custom-designed system/application or provided by an external vendor, a version number of a control, an update status of the control, or the like). The effectiveness scores may be based on one or more considerations described above with reference to FIG. 2.

At step 316, the security platform 120 may determine compliance scores for each of the controls as indicated in the control information. A control may be associated with a plurality of protocols/features/practices and a compliance score for the control may be a quantitative measure of how many of the protocols/features/practices are being used at the enterprise system. For example, a control corresponding to the received control information may include using password protection features (e.g., password monitoring, IP address logging, password policies, password recycling, two-factor authentication, etc.) for the enterprise system. The control information may indicate that a first set of password protection features (e.g., password monitoring, IP address logging, and, password recycling) are used and a second set of password protection features (e.g., password policies and two-factor authentication) are not used. The security platform 120 may determine the compliance score for the control based on the use of the first set of password protection features and the non-use of the second set of password protection features. The compliance score may be a ratio of a number of features associated with the control that are being used and a total number of features defined for the control.

A compliance score may be a quantitative measure of how a control is being used in comparison with a protocol as may be determined by the enterprise organization. For example, one of the controls may be updating security applications in the enterprise system and the control information may indicate a frequency of security updates performed in the enterprise system. The enterprise organization may specify a protocol wherein security updates are to be performed at a recommended frequency (e.g., on a weekly basis). The security platform 120 may determine the compliance score based on indicated frequency and the recommended frequency, where the compliance score may be lower if the indicated frequency is lower than the recommended frequency. In an example, the mapping database 125 may store an indication of the recommended frequency and the security platform 120 may query the mapping database 125 to determine recommended frequency.

Another control may be employee training (e.g., for email security, online practices, etc.) and the control information may indicate a time interval since a last time employee training was performed. The enterprise organization may specify a protocol wherein employees are to be trained every recommended time interval (e.g., every quarter). The security platform 120 may determine the compliance score based on indicated time interval and the recommended time interval, where the compliance score may be lower if the indicated time interval is higher than the recommended time interval. In an example, the mapping database 125 may store an indication of the recommended time interval and the security platform 120 may query the mapping database 125 to determine recommended time interval.

At step 320, the security platform 120 may determine, based on the determined effectiveness scores and compliance scores, vulnerability scores for each of the attack vectors. For example, the security platform 120 may use one or more equations described above to determine the vulnerability scores. Based on the vulnerability scores, the security platform 120 may determine whether the enterprise system is compliant with respect to protection against the attack vectors. For example, the security platform 120 may compare a determined vulnerability score for an attack vector with a threshold vulnerability score. The security platform 120 may determine that the enterprise system is vulnerable to an attack vector, for example, if a determined vulnerability score for the attack vector is lower than a threshold vulnerability score associated with the attack vector. Threshold vulnerability scores for different attack vectors may be set to a same value or may be set to different values.

The security platform 120 may further determine additional recommended controls to be used for the attack vectors. The security platform 120 may determine additional recommended controls for an attack vector, for example, if a vulnerability score for the attack vector is low (e.g., lower than a threshold associated with the attack vector). The security platform 120 may use the mapping between the controls and the attack vectors to determine additional recommended controls. The security platform 120 may determine the additional recommended controls based on effectiveness scores associated with the controls. For example, for an attack vector, the security platform 120 may determine one or more additional recommended controls that are mapped to the attack vectors and have high effectiveness scores, for example, if a determined vulnerability score for the attack vector is low. The security platform 120 may determine additional features/protocols, associated with a control, that may be used to improve compliance (e.g., a compliance score) with a control. The security platform 120 may determine additional features/protocols of a control that is most relevant (e.g., with the highest effectiveness score) among all controls that are mapped to an attack vector. For example, considering the example of the password brute force attack vector, the security platform 120 may determine that the password brute force attack vector is associated with a low vulnerability score and the most relevant control for this attack vector is using password protection features. The security platform 120 may recommend that the enterprise system use one of the password protection features (e.g., two-factor authentication) if the feature is not being used.

At step 324, the security platform 120 may send a security report to the enterprise user computing device 115. The security report may comprise the determined vulnerability scores, an indication of whether the system is compliant with respect to protection against an attack vector, and/or the determined recommended controls/improvement in compliance to the security platform 120. Sending of the security report to the enterprise user computing device 115 may cause a display of the security report in a GUI at the enterprise user computing device 115. The security report may alert a user with respect to potential attack vectors that the enterprise system is vulnerable to, and may further indicate steps that may be undertaken to reduce vulnerability.

In some examples, it may be difficult to determine/quantify use of some controls. In such a scenario, the security platform 120 may be unable to determine a compliance score associated with those controls. For example, a response to a query regarding the use of a particular control in the questionnaire 400 may be set to "indeterminate" or "don't know." As another example, the security platform 120 may, based on scanning the devices associated with an enterprise system, be unable to determine whether or not a particular control is being used. The security platform 120 may, for determining a compliance score and/or a vulnerability score, ignore (e.g., not take into consideration) a control for which usage information is indeterminate or unknown. The security platform 120 may determine a vulnerability score for an attack vector based on information regarding other controls that are mapped to the attack vector and ignore the control for which usage information is indeterminate or unknown. If the vulnerability score of the attack vector mapped to the control is determined to be lower than a threshold, the security platform 120 may send a request for additional information to the enterprise user computing device 115. The administrative user may then be provided an opportunity to review the control and provide information associated a use of the control. Using this two-step approach may enable filtering out attack vectors that are determined to be less threatening in a first step, while requiring additional investigation of controls in place for attack vectors that a system is deemed to be more vulnerable to.

For example, one of the controls may be regarding use of security processes/features for client data protection. This control may be mapped to multiple different attack vectors (e.g., man-in-the-middle, weak passwords, stolen credentials, etc.). If the security platform 120 is unable to determine control information corresponding to the use of security processes/features, the security platform 120 may ignore the control for determining the vulnerable scores for the multiple attack vectors. If a vulnerability score for an attack vector (e.g., a man-in-the-middle attack vector) is determined to be lower than a threshold or is lower in comparison with other vulnerability scores associated with other attack vectors, the security platform 120 may request information regarding the security processes/features for client data protection. This may reduce the burden on the system (or an administrative user) by only requiring additional information associated with a control, if a vulnerability score corresponding to an attack vector is low (e.g., if an enterprise system is at higher attack risk via the attack vector). This may enable more efficient resource management for determination of attack surfaces at the enterprise organization.

Figure 5:
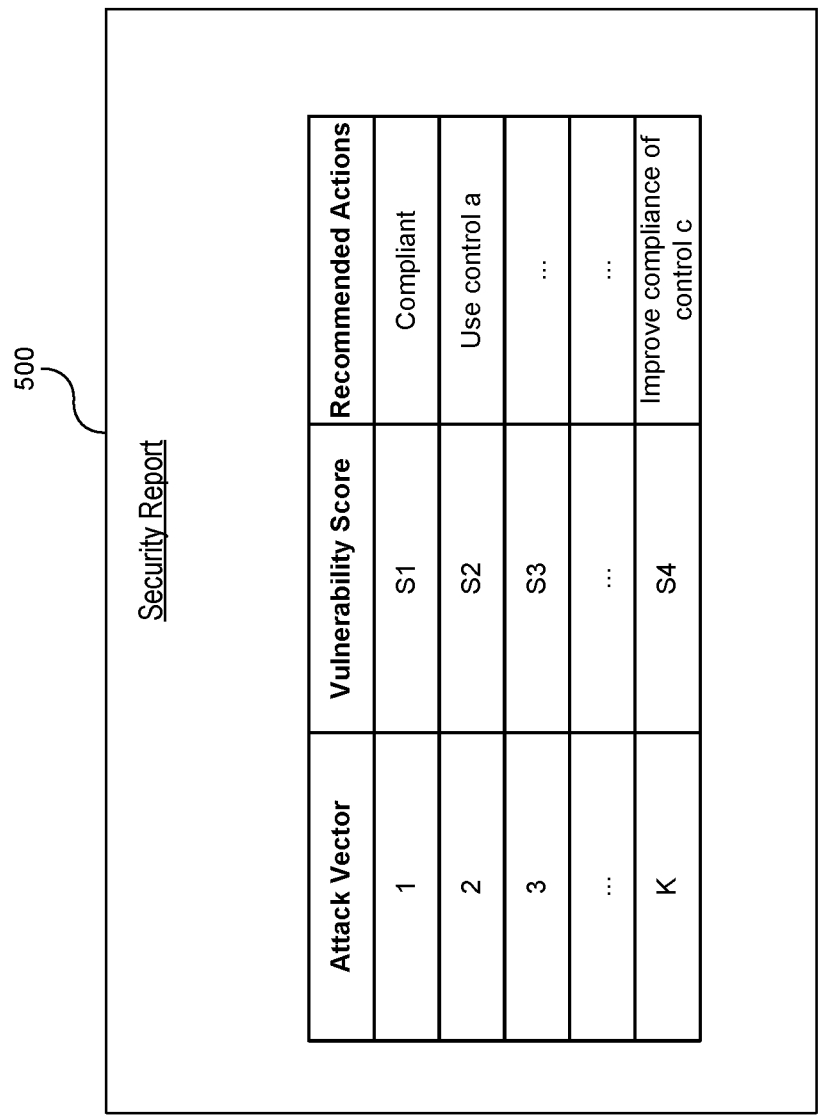
FIG. 5 shows an example GUI that may displayed on an enterprise user computing device based on a security report received from a security platform, in accordance with one or more example embodiments.

FIG. 5 shows an example GUI 500 that may displayed on the enterprise user computing device 115 based on a security report received from the security platform 120. The example GUI 500 may indicate attack vectors analyzed, corresponding vulnerability scores, and/or recommended actions. For example, the example GUI 500 may indicate a vulnerability score of the attack vector 1 and further indicate that the controls used for attack vector 1 are compliant for protecting the enterprise system against attacks using attack vector 1. For attack vector 2, the security platform 120 may determine that a corresponding vulnerability score is low and determine additional recommended controls that may be used to improve the vulnerability score. The GUI 500 may indicate the additional recommended controls as determined by the security platform 120. For attack vector K, the security platform 120 may determine that a corresponding vulnerability score is low and recommend improvement in compliance to one of the controls used for the attack vector K. For example, if the control is performing security updates, the security platform 120 may determine that security updates may need to be performed more frequently to improve compliance. The GUI 500 may indicate that the frequency of the security updates needs to be increased to improve compliance with the control.

Figure 6:
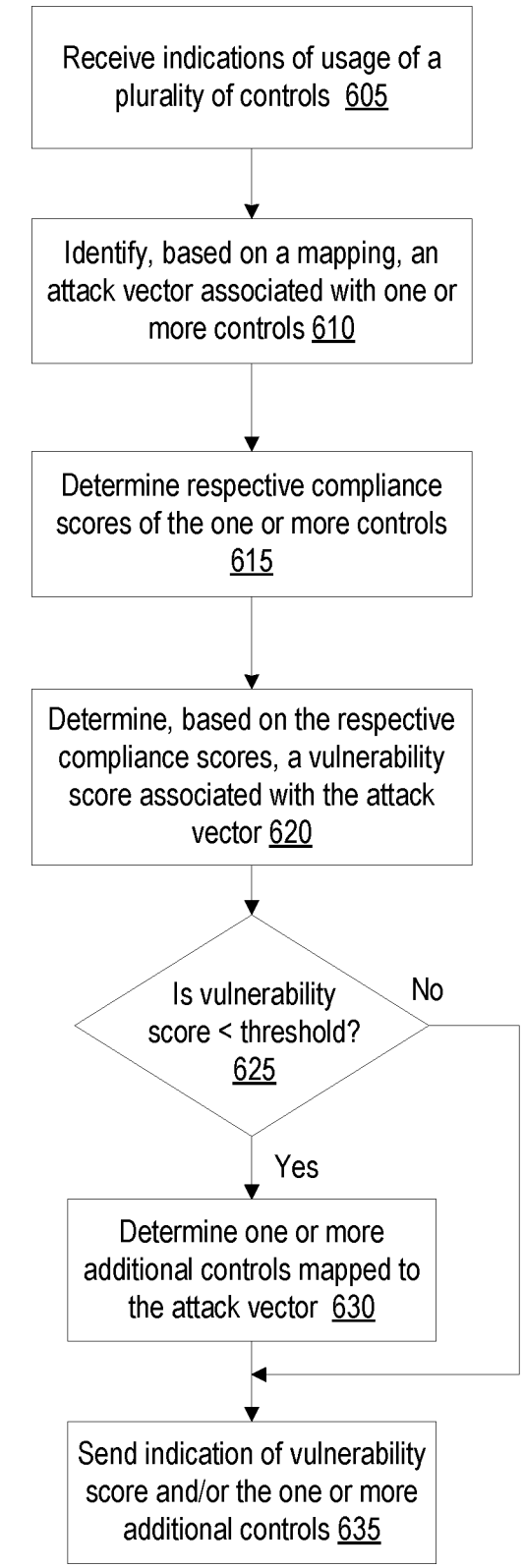
FIG. 6 shows an example algorithm for quantifying attack surfaces and providing security reports, in accordance with one or more example arrangements.

FIG. 6 shows an example algorithm 600 for quantifying attack surfaces and providing security reports, in accordance with one or more example arrangements. The example algorithm may be performed at the security platform 120, and/or any other device in the private network 155. At step 605, the security platform 120 may receive (e.g., from the enterprise user computing device 115) indications of usage of a plurality of controls in an enterprise system. An indication of a usage of a control may indicate whether a control is being used in the enterprise system. A control may be associated with a plurality of protocols/practices/features, and an indication of a usage of a control may indicate whether one or more protocols/practices/features among the plurality of protocols/practices/features are being used.

At step 610, the security platform 120 may identify an attack vector associated with one or more controls among the plurality of controls. The security platform 120 may use the mapping database 125 to identify the attack vector. For example, with reference to FIG. 2, if the security platform 120 receives indications of usages of controls a-N the security platform 120 may determine the attack vector 1 that is mapped to the controls a and b.

At step 615, the security platform 120 may determine respective compliance scores associated with the one or more controls. The security platform 120 may use one or more techniques described with reference to FIGS. 2-4 to determine the respective compliance scores. For example, for the attack vector 1, the security platform may determine respective compliance scores of the control a and the control b. If control a is being used and control b is not being used, the compliance score of control a may be 1 (or less than 1 but greater than 0) and the compliance score of control b may be 0.

At step 620, the security platform 120 may determine, based on the respective compliance scores, a vulnerability score associated with the attack vector. Further, effectiveness scores of the one or more controls may be used to determine the vulnerability score. For example, the security platform may use any of Equations (1)-(4) to determine the vulnerability score.

At step 625, the security platform 120 may determine whether the determined vulnerability score is lower than a threshold vulnerability score. If the determined vulnerability score is lower than the threshold vulnerability score, at step 630, the security platform 120 may determine/identify one or more additional controls that are mapped to the attack vector but are not being used. For example, with reference to the attack vector 1, the security platform 120 may determine control b mapped to the attack vector 1. Additionally, or alternatively, the security platform 120 may determine one or more protocols/practices/features associated with controls a and b that are not being used.

If, at step 625, the vulnerability score is not lower than a threshold, the process may continue at step 635.

At step 635, the security platform 120 may send an indication of the determined vulnerability score. If the determined vulnerability score is lower than a threshold, the security platform 120 may additionally send indications of the one or more additional controls and/or the one or more protocols/practices/features. The sending of the determined vulnerability score and/or the indications of the one or more additional controls and/or the one or more protocols/practices/features may cause their display at the enterprise user computing device 115.

Various examples described herein enable precise quantification of attack surfaces of an enterprise system based on controls used and further based on a mapping between the controls and attack vectors that may be used to target the enterprise system. Further, based on the quantification, one or more additional controls and/or one or more additional protocols/practices/features that may be used to improve security of the enterprise system may be determined. This may enable a system to alert a user regarding potential attack vectors that a system may be vulnerable to and recommend steps that may be performed to reduce vulnerabilities, thereby improving network security.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface and from a computing device, indications of usage of a plurality of controls associated with an enterprise computing system;
   identify, based on a mapping between the plurality of controls and a plurality of attack vectors:
   one or more controls of the plurality of controls that are mapped to an attack vector, and
   respective effectiveness scores of the one or more controls that are mapped to the attack vector;
   determine, based on indications of usage of the one or more controls, respective compliance scores of the one or more controls;
   determine, based on the respective compliance scores and the respective effectiveness scores, a vulnerability score associated with the attack vector; and
   send, via the communication interface to the computing device, an indication of the determined vulnerability score associated with the attack vector.

2. The computing platform of claim 1, wherein the enterprise computing system comprises a plurality of sub-systems, and wherein the attack vector targets one or more sub-systems within the plurality of sub-systems.

3. The computing platform of claim 1, wherein:
   an effectiveness score of a control is a quantity between 0 and 1; and
   a compliance score of a control is a quantity between 0 and 1.

4. The computing platform of claim 1, wherein an effectiveness score of a control mapped to an attack vector is proportional to an effectiveness of the control at protecting the enterprise computing system from an attack using the attack vector.

5. The computing platform of claim 1, wherein the determining the vulnerability score comprises determining a sum of products of the respective compliance scores and the respective effectiveness scores.

6. The computing platform of claim 1, wherein a compliance score of zero indicates that a control is not used at the enterprise computing system.

7. The computing platform of claim 1, wherein a compliance score that is greater than zero indicates that a control is used at the enterprise computing system.

8. The computing platform of claim 7, wherein the computer-readable instructions, when executed by the at least one processor, cause the computing platform to determine the compliance score of the control based on:
   a total quantity of protocols associated with the control; and
   a quantity of protocols, among the protocols associated with the control, used at the enterprise computing system.

9. The computing platform of claim 1, wherein the computer-readable instructions, when executed by the at least one processor, cause the computing platform to:
   compare the determined vulnerability score with a threshold vulnerability score; and
   responsive to determining that the determined vulnerability score is lower than the threshold vulnerability score, transmit, via the communication interface to the computing device, an indication that the one or more controls are not compliant.

10. The computing platform of claim 9, wherein the computer-readable instructions, when executed by the at least one processor, cause the computing platform to:
    determine, based on the mapping, one or more additional controls mapped to the attack vector, wherein the one or more additional controls are not being used at the enterprise computing system; and
    send, via the communication interface to the computing device, an indication of the one or more additional controls.

11. The computing platform of claim 10, wherein the one or more additional controls comprise at least one control among the one or more controls.

12. The computing platform of claim 1, wherein the determining the vulnerability score is based on a quantity of the one or more controls that are mapped to the attack vector.

13. The computing platform of claim 1, wherein the computer-readable instructions, when executed by the at least one processor, cause the computing platform to:
determine one or more additional vulnerability scores associated with one or more other attack vectors among the plurality of attack vectors;
determine an aggregate vulnerability score based on the vulnerability score of the attack vector and the one or more other additional vulnerability scores associated with the one or more other attack vectors; and
send, via the communication interface to the computing device, an indication of the aggregate vulnerability score.

14. A method comprising:
receiving, via a communication interface and from a computing device, indications of usage of a plurality of controls associated with an enterprise computing system;
identify, based on a mapping between the plurality of controls and a plurality of attack vectors:
one or more controls of the plurality of controls that are mapped to an attack vector, and
respective effectiveness scores of the one or more controls that are mapped to the attack vector;
determining, based on indications of usage of the one or more controls, respective compliance scores of the one or more controls;
determining, based on the respective compliance scores and the respective effectiveness scores, a vulnerability score associated with the attack vector; and
sending, via the communication interface to the computing device, an indication of the determined vulnerability score associated with the attack vector.

15. The method of claim 14, further comprising:
comparing the determined vulnerability score with a threshold vulnerability score; and
if the determined vulnerability score is lower than the threshold vulnerability score, transmitting, via the communication interface to the computing device, an indication that the one or more controls are not compliant.

16. The method of claim 15, further comprising:
determining, based on the mapping, one or more additional controls mapped to the attack vector, wherein the one or more additional controls are not being used at the enterprise computing system; and
sending, via the communication interface to the computing device, an indication of the one or more additional controls.

17. The method of claim 14, wherein a compliance score of zero indicates that a control is not used at the enterprise computing system.

18. A non-transitory computer readable medium storing computer executable instructions that, when executed by a processor, cause:
receiving, via a communication interface and from a computing device, indications of usage of a plurality of controls associated with an enterprise computing system;
identify, based on a mapping between the plurality of controls and a plurality of attack vectors:
one or more controls of the plurality of controls that are mapped to an attack vector, and
respective effectiveness scores of the one or more controls that are mapped to the attack vector;
determining, based on indications of usage of the one or more controls, respective compliance scores of the one or more controls;
determining, based on the respective compliance scores and the respective effectiveness scores, a vulnerability score associated with the attack vector;
transmitting, via the communication interface to the computing device, an indication of the determined vulnerability score associated with the attack vector.

* * * * *